(12) United States Patent
Lacy

(10) Patent No.: US 8,453,337 B2
(45) Date of Patent: Jun. 4, 2013

(54) SYSTEM AND METHOD FOR WORKPIECE COORDINATE MEASUREMENTS

(76) Inventor: James Richard Lacy, Shawano, WI (US)

( * ) Notice: Subject to any disclaimer, the term of this patent is extended or adjusted under 35 U.S.C. 154(b) by 757 days.

(21) Appl. No.: 12/616,252

(22) Filed: Nov. 11, 2009

(65) Prior Publication Data
US 2010/0299945 A1 Dec. 2, 2010

Related U.S. Application Data

(60) Provisional application No. 61/217,572, filed on Jun. 2, 2009.

(51) Int. Cl.
*G01B 5/008* (2006.01)

(52) U.S. Cl.
USPC .............................................. 33/503; 33/1 M

(58) Field of Classification Search
USPC ............................ 33/502, 503, 504, 549, 1 M
See application file for complete search history.

(56) References Cited

U.S. PATENT DOCUMENTS

| | | | |
|---|---|---|---|
| 4,561,050 A | 12/1985 | Iguchi et al. | |
| 4,627,362 A | 12/1986 | Ise et al. | |
| 4,796,195 A | 1/1989 | Haggerty | |
| 5,355,575 A | 10/1994 | Self | |
| 5,471,406 A | 11/1995 | Breyer et al. | |
| 5,610,846 A | 3/1997 | Trapet et al. | |
| 5,856,924 A * | 1/1999 | Brost et al. | 700/182 |
| 6,193,048 B1 | 2/2001 | Keith | |
| 6,317,991 B1 * | 11/2001 | Rinn | 33/1 M |
| 6,463,664 B1 * | 10/2002 | Bieg | 33/1 M |
| 6,679,369 B2 * | 1/2004 | Okuyama | 198/346.1 |
| 6,739,031 B2 | 5/2004 | Shimizu | |
| 7,108,647 B2 | 9/2006 | Nakazawa et al. | |
| 7,293,365 B2 * | 11/2007 | McMurtry et al. | 33/556 |
| 2006/0283034 A1 * | 12/2006 | McMurtry et al. | 33/556 |
| 2010/0299945 A1 * | 12/2010 | Lacy | 33/503 |
| 2012/0084989 A1 * | 4/2012 | Pettersson et al. | 33/503 |

FOREIGN PATENT DOCUMENTS

JP 7324928 A 12/1995

* cited by examiner

*Primary Examiner* — Yaritza Guadalupe-McCall
(74) *Attorney, Agent, or Firm* — Steven H. Greenfield; Greenfield Invention and Patent Consulting, Inc.

(57) ABSTRACT

A system and method for accurately positioning workpieces to permit uninterrupted coordinate measurements using a CMM is disclosed. The system comprises at least one movable platform adapted for moving on a stationary platform, fixtures for affixing workpieces to the movable platform, and locator stops and locators for affixing the movable platform in a predetermined measurement area on the stationary platform. An air jet injected into the bottom of the movable platform facilitates conveying the platform to the measurement area. The method comprises mounting one or more workpieces in a predetermined position on the movable platform fixture and positioning the movable platform against locator stops on the stationary platform. A second workpiece may be mounted on the fixtures of a second movable platform while the CMM measurements are in progress. This procedure may be repeated for successive workpieces and enables a near assembly line process for measuring workpiece coordinates.

13 Claims, 6 Drawing Sheets

SYSTEM AND METHOD FOR WORKPIECE COORDINATE MEASUREMENTS

RELATED APPLICATIONS

This application claims priority from provisional application No. 61/217,572 filed on Jun. 2, 2009.

FIELD OF THE INVENTION

The present invention relates to a system for transporting and precisely positioning objects. More specifically, the present invention relates to a system and method for positioning of workpieces on a platform within a predetermined tolerance in a manner that allows expeditious and uninterrupted measurements of their coordinates for quality control purposes. More specifically yet, the present invention provides a system and method for safe transporting and safe and speedy positioning of various workpieces to be inspected by a Coordinate Measuring Machine (CMM).

BACKGROUND OF THE INVENTION

An important use of Coordinate Measuring Machines (CMM) is the inspection of manufactured workpieces to insure that they meet manufacturing specifications. Commonly, the CMM includes a computer program to take a series of readings of coordinate data at various locations on the workpiece, in order to perform a complete inspection of the desired dimensions of the workpiece. A determination can then be made as to whether the workpiece is of acceptable quality, or whether it should be rejected. Currently, inspection of workpieces using CMMs involves placing a workpiece on an inspection table and activating a computer program that prompts the CMM probe to the proximity of the workpiece, prompts a position alignment qualification step of the probe with respect to the workpiece, then prompts the probe to perform the inspection. This time consuming position alignment qualification step needs to repeat with every workpiece as, without it, the CMM probe may crash into the workpiece and incur damage as it is seeking its surface. Furthermore, conveying heavy workpieces to the CMM measurement area may be time consuming as well as risks personal injury and damage to the measurement area if not performed with a great deal of care.

Prior art references disclose a number of ways to correct for calibration errors and improve calibration speed.

U.S. Pat. No. 4,561,050 relates in general to machining centers having a plurality of tools for successively machining a workpiece. More specifically, the invention provides an arrangement for automatically taking into account different lengths of successively used tools so as to relieve the operator of extensive "adjustment" each time one tool is exchanged for another.

U.S. Pat. No. 4,796,195 discloses a method for effecting numerically controlled machining operations at a predetermined location. A reference feature is fixed proximate to the predetermined location and the location of a reference surface is measured prior to machining to produce surface signals representing the coordinates of the reference surface. Location correction signals are produced in response to the reference surface signals.

U.S. Pat. No. 5,471,406 refers to a method for the rapid measurement of workpieces having elemental shapes of known geometry in any orientation in space. The elemental shapes are scanned on a CMM equipped with a measuring probe head having a permissible measurement range (MR).

The method in U.S. Pat. No. 5,610,846 is used to determine the elastic bending of CMMs as a result of the measuring force and the position of measuring slides in the measuring range of the machine. Correction values are determined, which are used to compensate for measuring errors caused by machine bending. The correction values are a function of the position of the measuring slides and on the measuring force between the probe of the coordinate measuring machine and workpieces within the measuring range and are established and stored for several positions.

U.S. Pat. No. 5,856,924 describes a fixture processor for automatically designing a fixture design based on input criteria and constraints. The electronic processor uses mathematical calculations and iterations that are used in design optimization algorithms. The output of the fixture processor designates the locations for optimal securing of the workpiece for inspection for which vices and jaws are used.

Japanese Patent number JP 7324928 teaches a method for storing the coordinates of a measuring machine's deformation characteristics as a function of the measuring slider position and slider acceleration in the form of correction values and subsequently, data measured by the CMM are corrected when a workpiece is subjected to its coordinates' measurement by means of correction values.

None of the prior art references identified relate to workpiece measurement replication and no references that address the issue of conveying and positioning various workpieces for coordinate measurements have been identified.

SUMMARY OF THE PRESENT INVENTION

In one embodiment of the present invention a positioning system for inspecting workpieces comprises: a stationary platform containing a measurement area; at least one movable platform disposed onto the stationary platform; transport means adapted to assist in conveying the movable platform to the measurement area; at least one stationary locator stop disposed in the measurement area; and at least one positioning locator disposed on each movable platform.

In another embodiment of the present invention, a method for conducting uninterrupted coordinate measurements on workpieces using a CMM comprises the steps of: providing a stationary platform having a measurement area and a setup area, said measurement area containing one or more locator stops disposed in predetermined locations in the measurement area; providing a first movable platform and a second movable platform disposed on the stationary platform, said each movable platform comprising at least one positioning locator; providing transport means for the first movable platform and for the second movable platform; positioning a first workpiece on the first movable platform, said first movable platform being positioned in a first setup position in the setup area; conveying said first movable platform from the first setup position to a first measurement position on the stationary platform; activating the CMM to begin coordinate measurements; while the CMM performs the measurements, positioning a second workpiece on the second movable platform said second movable platform being positioned in a second setup position in the setup area; when CMM measurements are completed, conveying the first movable platform from the first measurement position back to the first setup position; conveying the second movable platform from the second setup position to a second measurement position on the stationary platform; activating the CMM to begin coordinate measurements; and when CMM measurements are completed, conveying the second movable platform from the second measurement position back to the second setup position.

These and other features, aspects and advantages of the present invention will become better understood with reference to the following drawings, description and claims.

BRIEF DESCRIPTION OF THE DRAWINGS

FIG. 7 is a flow chart for a method for performing coordinate measurements on a workpiece according to an embodiment of the present invention.

DETAILED DESCRIPTION OF THE INVENTION

Figure 1:
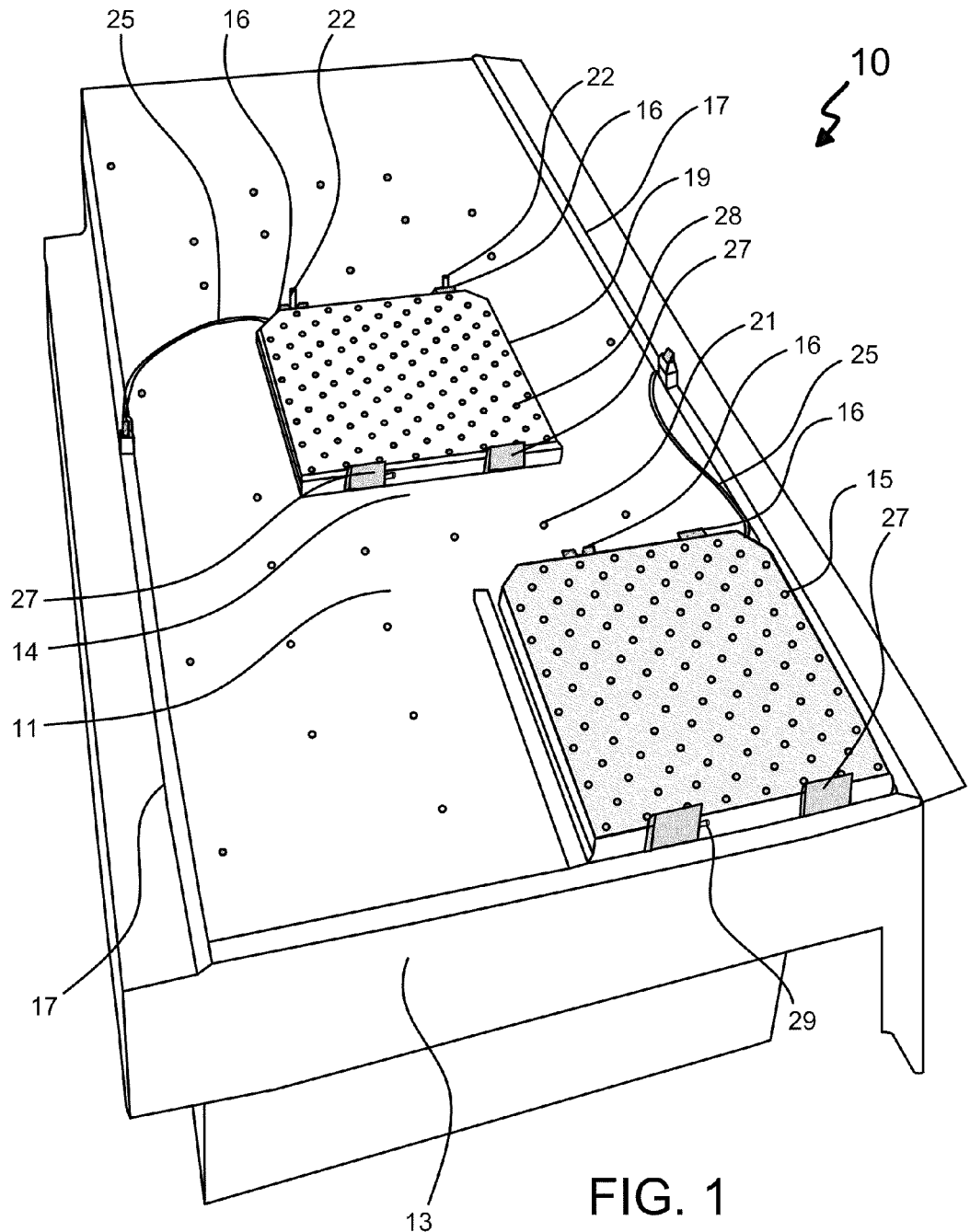
FIG. 1 is an isometric view of a positioning system arrangement for performing coordinate measurements according to an embodiment of the present invention.

Coordinate measuring machines (CMM) utilize a probe attached to an arm that is part of a moving frame. The frame is typically movable over a measurement platform that contains the workpiece. A computer program that contains the design x-y-z coordinates of the workpiece components instructs the probe to take a series of coordinate readings of the workpiece. If the readings match the design coordinates within a specified tolerance, the workpiece passes inspection. In the alternative, the computer identifies one or more manufacturing flaws and provides information that enables the manufacturer to readjust the manufacturing parameters to prevent the recurrence of the flaw as well as to possibly rework the piece in order to correct the flaw. A typical first step in conducting the coordinate measurement is a manually controlled alignment and movement of the probe to "seek out" the location of the workpiece. This requires that the probe move slowly until it identifies several points on the workpiece surface that enables the CMM to translate the workpiece features, size and geometry and compare them with the design coordinates. The slow movement is essential to avoid crashing the probe onto the surface of the workpiece that could severely damage the probe's sensitive tip. However, this significantly slows down the process of inspecting multiple workpieces that are continually generated in the manufacturing lines.

Workpiece placement in the measurement area for expeditious CMM measurement is also an issue. Workpieces may be manually carried onto the measurement platform or, if the workpiece is heavy, a hoist may be used. In order to avoid damage to the platform, workpiece placement must be done carefully which also slows down the measurement process. With the present invention, the workpiece is placed on a movable platform that separates and protects the precision stationary platform and is handily transported to the measurement area which reduces the risk of damage and speeds up the process.

The present invention contains a stationary platform equipped with a CMM system that comprises a frame and an arm adapted to rotating and swivelling to which a probe is attached. The probe has a tip that lightly probes the surfaces of the workpieces and transmits position information to a computer software that analyzes the information. The surface of the stationary platform is preferably made of a hard material such as granite, but other materials such as steel and plastic also fall within the scope of the present invention. In an embodiment of the present invention, the stationary platform is part of a table equipped with guardrails that prevent the movable platform from sliding off the table and has a dedicated measurement area which comprises locator stops used for positioning the workpieces. The measurement area is commonly disposed at a middle portion of the table just below the CMM frame. In this embodiment of the present invention, the locator stops are metal rods threaded into blind holes drilled into the surface of the measurement area. In another embodiment, the locator stops are substantially spherically shaped balls.

Two movable platforms are stationed on a front part of the table. In an embodiment of the present invention, the movable platforms are metal plates that contain a plurality of holes arranged in a random or in a grid pattern. The holes may be sleeved and threaded blind drilled holes but sleeveless through holes also fall within the scope of the present invention. Additional plates stationed in the front part of the table or in a back part of the table are also within the context of the present invention. The plates are further equipped with positioning locators disposed at the front part of each plate. The positioning locators are configured to brace against the locator stops on the stationary platform to locate in the predetermined position for the plate and to prevent any movement of the plate. The predetermined position for a workpiece is that which is programmed into the CMM computer.

One or more fixtures used for supporting and holding workpieces may be mounted on a movable platform plate and one or more workpieces may be mounted onto the fixtures on the movable platform. The fixtures maybe securely fastened onto the plate by threading one or more metal rods into the blind holes on the surface of the plate. The fixtures are configured to securely hold the workpieces in place in a manner that prevents movement of the workpiece as well as provide an arrangement for the workpiece that is accessible to the CMM probe. The fixtures are also configured to enable speedy and reproducible placement and replacement of the workpieces on the fixture in a predetermined location that varies within only an allowable tolerance from the predetermined position programmed into the CMM computer. This tolerance has been empirically determined to be about 0.02 inches. If this positioning tolerance is exceeded, the CMM probe tip may crash into the workpiece that may result in damage to the tip. Exceeding the tolerance may be the result of a combination of an inaccuracy in positioning the workpiece on the fixtures, an inaccuracy of positioning the plate in the measurement area, and variances in the manufacturing of the workpieces.

To insure that a workpiece is positioned within the allowable positioning tolerance, several approaches may be used depending on the size and shape of the workpieces:
1. Bracing appropriate notched or indented areas on the workpieces against wedges on the fixtures;
2. Placing certain parts of the workpieces on support rods that are part of the fixtures;
3. Clamping parts of the workpieces; and
4. Placing markers on the workpieces which must align with corresponding markers on the fixtures.

5. Using shims that wedge into tight corners to insure accurate placement and alignment of the workpieces.

Thus configuring each set of fixtures is workpiece specific.

In an embodiment of the present invention, a workpiece is placed on a movable platform as the movable platform is situated in the front part of the table that is used as a set up area for placing the workpiece onto the appropriate fixtures on the plate. The set up area is easily accessible to the operator and to a hoist needed for carrying a heavy piece. Once the workpiece is set up on the fixture, the movable platform is conveyed to the measurement area and the CMM measurements may then commence. In an embodiment of the present invention, an air jet is injected into the bottom of the movable platform to provide a layer of air between the plate and stationary platform for lessening the friction between the movable platform and the stationary platform in order to facilitate conveying the movable platform to the measurement area. The front part of each movable platform may comprise of a thumb control switch for activating the air jet and handles for manually guiding the movable platform to the measurement area. Following setup of the workpiece, the operator guides the plate with the workpiece against the locator stops on the measurement area using the positioning locators installed on the front of the plate. The operator then activates the CMM program. Since the workpiece is in a position that is now "known" to the computer program, there is no longer a need for a manually controlled alignment of the probe. While the measurement takes place, the operator may set up a second plate with a workpiece. When the CMM measurements are completed, the operator moves the first movable platform back to the set up position and moves the second plate to the measurement area. The procedure may be repeated for additional workpieces in a way that results in a nearly continuous process.

The means to transport the movable platform to the measurement area comprises of an air supply and air conduits leading from the air supply to a location on the table guardrails. Flexible hoses connect the guardrail conduits with the plates which contain air channels disposed in the bottom of the plates. When an operator presses the thumb control switch a valve opens which allows an air jet to stream between the bottom of the plate and the stationary platform. The air reduces friction and provides lift to the plate making it easier for the operator to convey the plate to the measurement area.

FIGS. 1-7 illustrate embodiments of the system and method performing coordinate measurements on workpieces using a CMM. The system 10 comprises a table 13 representing a stationary platform that includes a set up area 11 and measurement area 14. A plurality of blind drilled holes 21 is disposed on the surface of the stationary platform and used for placing locator stops such as 22. Two movable platforms represented by two metal plates 15 and 19 are disposed on the stationary platform. In FIG. 1, the first movable platform 15 is situated in the set up area 11, while the second movable platform 19 is situated in the measurement area 14 against locator stops 22. Positioning locators 16 help keep the plate 19 in place. In this embodiment, one of the positioning locators 16 comprises a notch into which the locator stop fits. Each plate contains a plurality of blind drilled holes such as 28 disposed on the surface of each plate. The holes are used for affixing rods, wedges and fixtures that help position and hold the workpiece in place.

Figure 2:
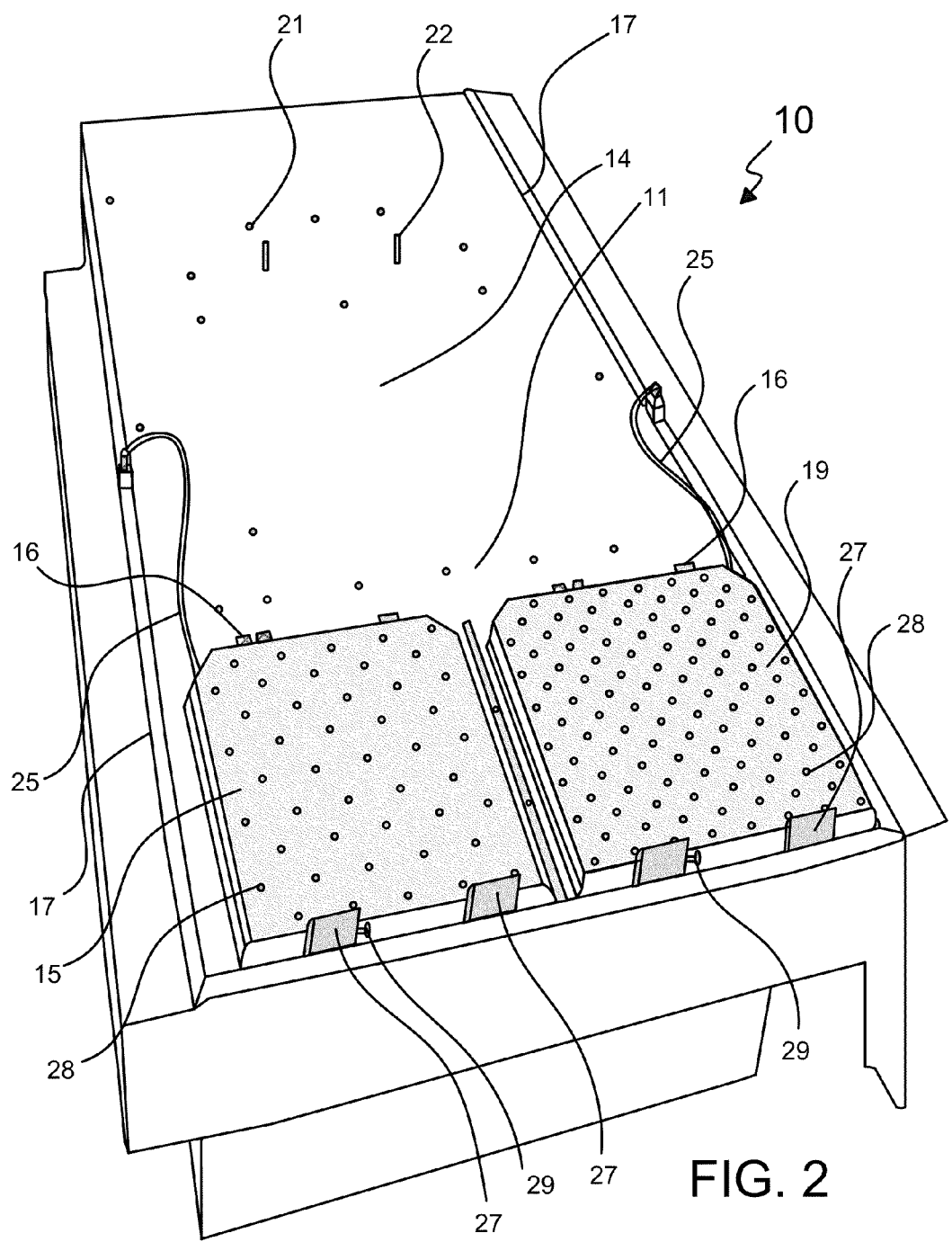
FIG. 2 is another isometric view of a positioning system arrangement for performing coordinate measurements according to an embodiment of the present invention.
Figure 3:
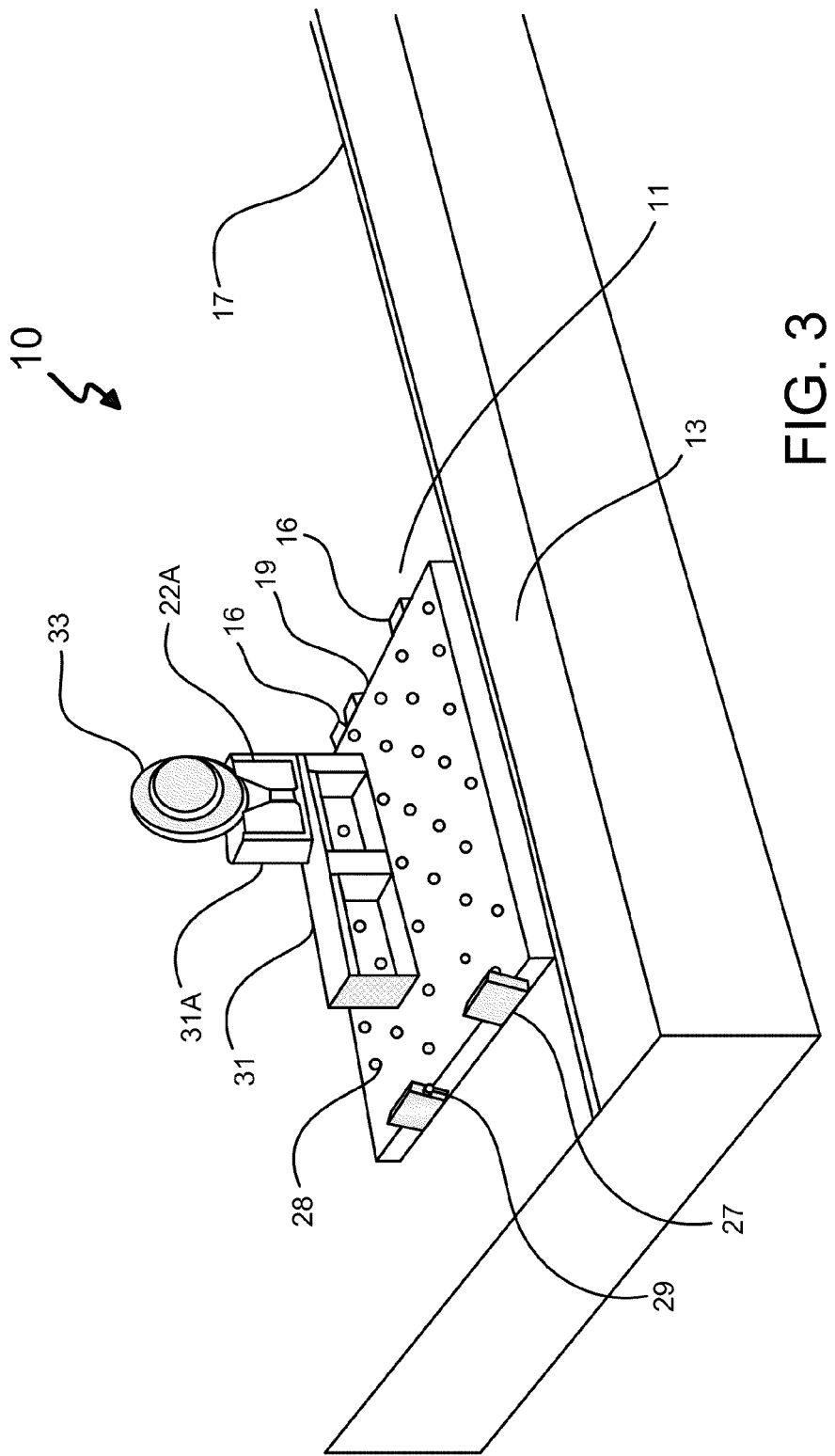
FIG. 3 is an isometric view of a workpiece setup for coordinate measurement positioning according to an embodiment of the present invention.
Figure 4:
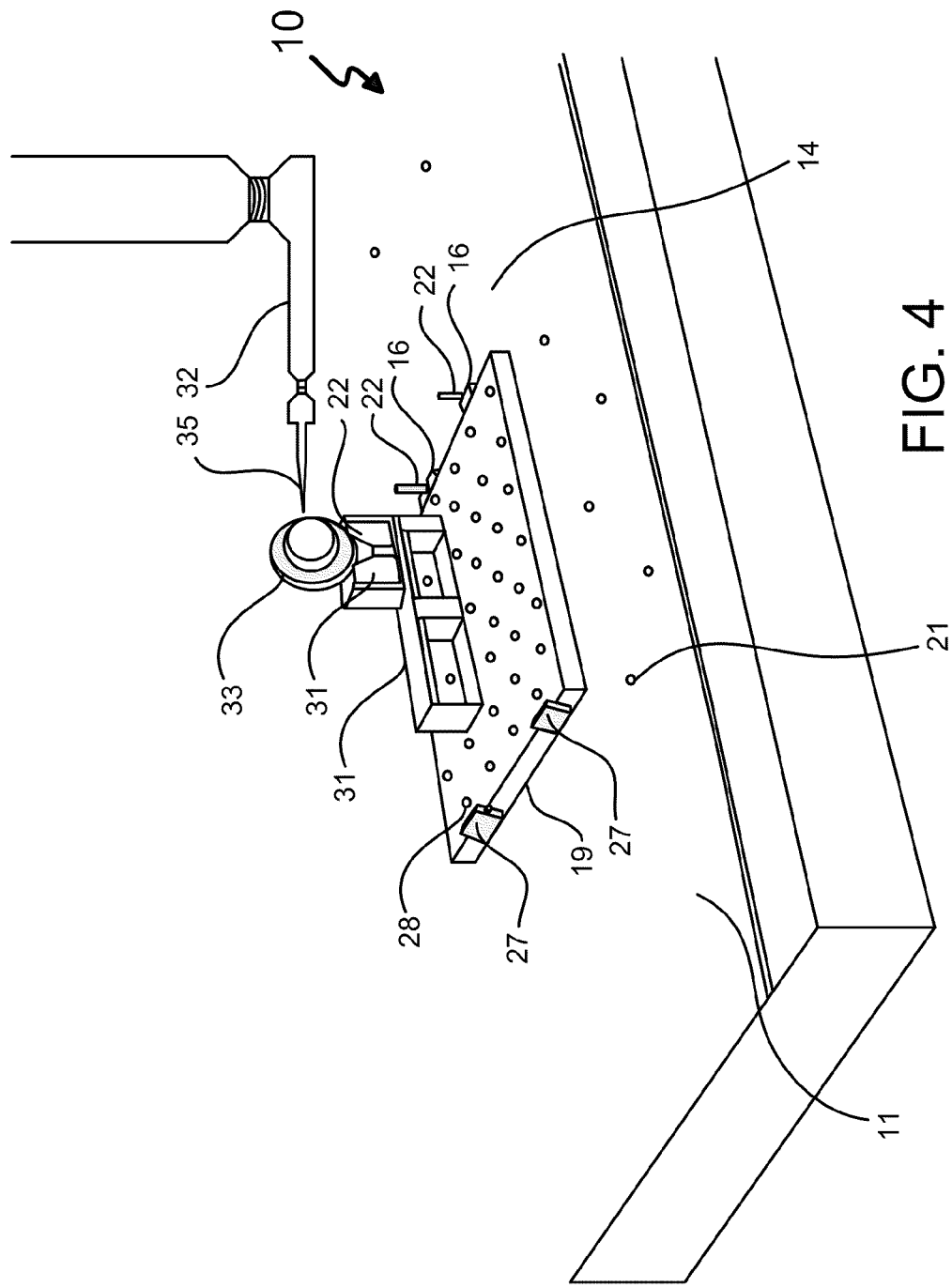
FIG. 4 is an isometric view of a workpiece positioning for performing coordinate measurements according to an embodiment of the present invention.
Figure 5:
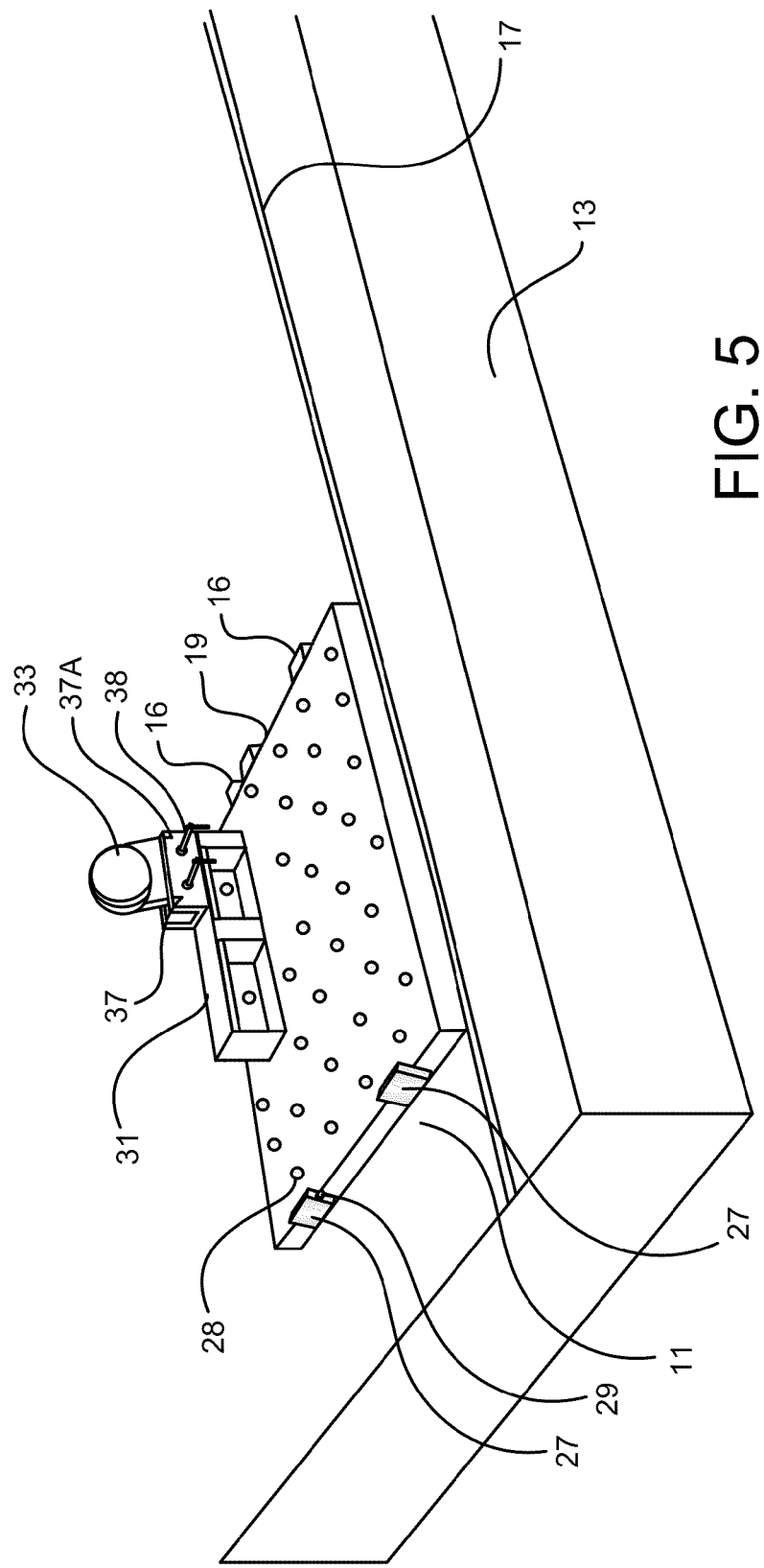
FIG. 5 is another isometric view of a workpiece setup for coordinate measurement positioning according to an embodiment of the present invention.
Figure 6:
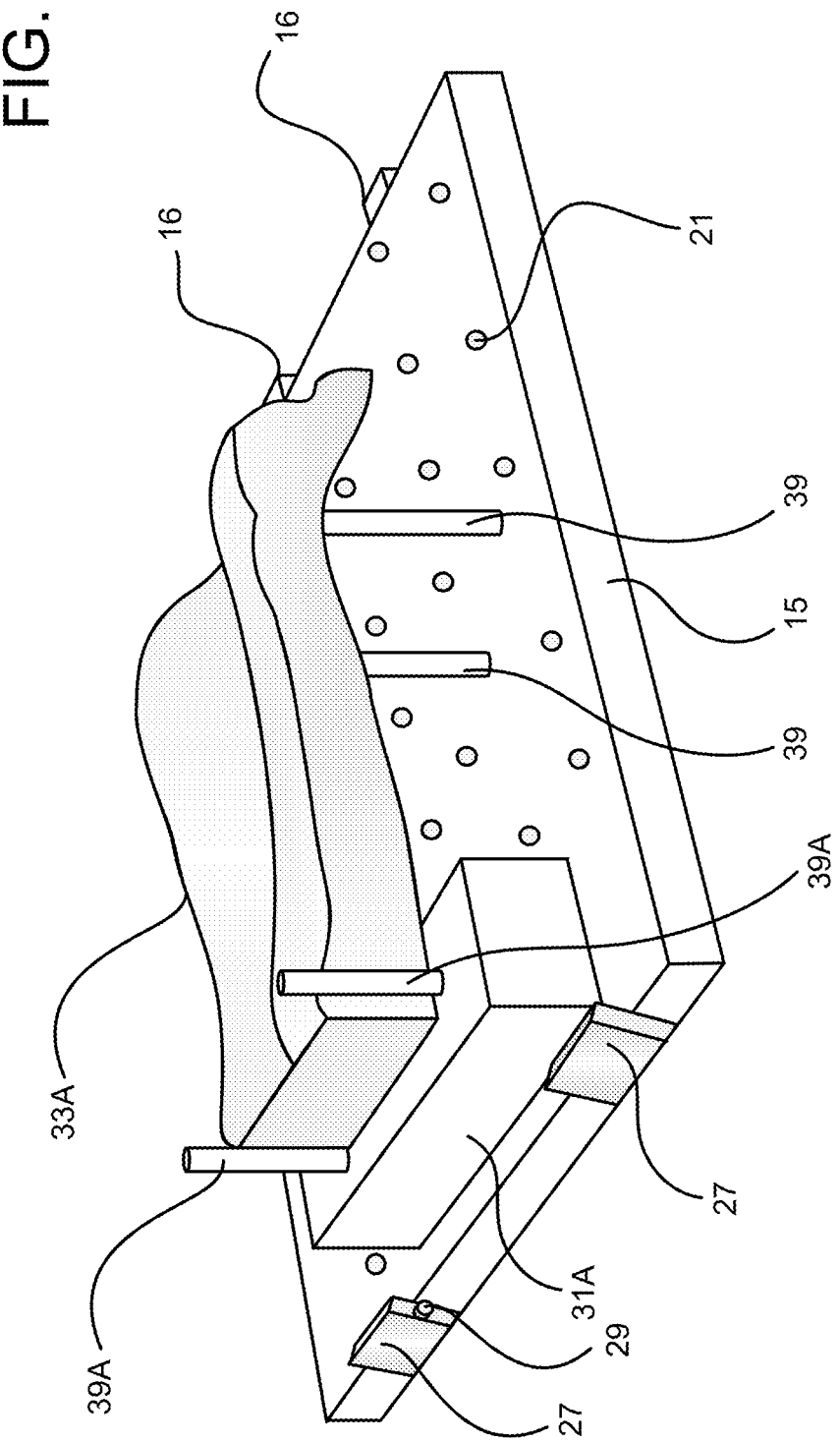
FIG. 6 is yet another isometric view of a workpiece setup for coordinate measurement positioning according to an embodiment of the present invention.

Since the stationary platform is large, the measurement area is not easily accessible to the operator for placing the workpiece in preparation for CMM measurements. Thus, the workpiece is placed on movable platform 19 which the operator then conveys to the measurement area 14 by pushing guiding handles 27. The conveying is helped by an air system that injects an air jet between the bottom surface of the movable platform 19 and the stationary platform that provides lift and reduces surface friction. The air flow is activated by pressing thumb control switch 29 and is stopped by releasing it. The air is supplied to the plates through guardrails 17 situated at the sides of the stationary platform and flexible hoses 25. The guardrails 17 also function to prevent the plates from moving off the table 13. FIG. 2 shows the two plates 15 and 19 situated in the set up area 11. In FIG. 3, fixture 31 is affixed onto metal plate 19 disposed in the set up area 11 and fixture 31A is placed on fixture 31. Workpiece 33 is positioned into fixture 31A and held in place by wedge 22A. In FIG. 4, the plate is in the measurement area 14 with the workpiece 33 undergoing coordinate measurements by a CMM having a pivoting arm 32 to which the measurement probe 35 is attached. FIG. 5 indicates another workpiece positioning embodiment in which clamp 38 is fastened onto fixture 31 and the workpiece 33 is held in place by the clamp 38. Helping position the workpiece within the required tolerance are two markers 37 and 37A. In yet another positioning embodiment shown in FIG. 6, workpiece 33A is positioned on metal rods threaded into blind drilled holes 21 in metal plate 15 representing wedges 39. Fixture 31A is fastened onto metal plate 15 and helps support workpiece 33A along with wedges 39A threaded into holes on fixture 31A.

FIG. 7 is a flow chart of the method 70 for accurately positioning workpieces to permit speedy and uninterrupted coordinate measurements using a CMM.

The method for performing coordinate measurements on workpieces using a CMM may be divided in two key areas: steps for setting up the workpiece and steps for positioning the workpiece. The detailed flow includes the steps of: providing a stationary platform having a measurement area containing one or more locator stops disposed in predetermined locations in the measurement area 71; providing two movable platforms disposed on the stationary platform 72; providing transport means for the movable platforms 73; positioning a first workpiece on a first movable platform 74; conveying the first movable platform from a first setup position on the stationary platform to a first measurement position on the stationary platform 75; activating the CMM to begin coordinate measurements 76; while the CMM performs the measurements, positioning a second workpiece on a second movable platform 77; when CMM measurements are completed, conveying the first movable platform from the first measurement position back to the first setup position 78; conveying the second movable platform from a second setup position on the stationary platform to a second measurement position on the stationary platform 79; activating the CMM to begin coordinate measurements 80; and when CMM measurements are completed, conveying the second movable platform from the second measurement position back to the second setup position 81.

I claim:

1. A positioning system for inspecting workpieces comprising:
    a stationary platform containing a measurement area, said measurement area comprises at least one hole, said each hole being adapted for affixing a locator stop;
    at least one movable platform disposed onto the stationary platform;
    transport means adapted to assist in conveying the movable platform to the measurement area;
    at least one stationary locator stop disposed in the hole contained in the measurement area, said hole in the measurement area being placed at an end portion of the movable platform in a manner such that the locator stop disposed in the hole is in contact with the end portion of the movable platform in such a manner as to prevent unintended movement of the movable platform; and at least one positioning locator disposed on each movable platform.

2. A positioning system for inspecting workpieces comprising:

a stationary platform containing a measurement area;

at least one movable platform disposed onto the stationary platform;

transport means adapted to assist in conveying the movable platform to the measurement area, wherein the movable platform comprises a plate having a top surface and a bottom surface, said top surface containing a plurality of holes;

one or more fixtures disposed onto the top surface of the movable platform, said fixtures being adapted for holding a workpiece, said fixtures containing at least one wedge for bracing a workpiece;

at least one stationary locator stop disposed in the measurement area; and at least one positioning locator disposed on each movable platform.

3. A positioning system for inspecting workpieces comprising:

a stationary platform containing a measurement area;

at least one movable platform disposed onto the stationary platform;

transport means adapted to assist in conveying the movable platform to the measurement area;

at least one stationary locator stop disposed in the measurement area; and at least one positioning locator disposed on each movable platform;

wherein a tolerance for positioning a workpiece relative to a predetermined position is about 0.02 inches.

4. A method for conducting uninterrupted coordinate measurements on workpieces using a CMM comprising the steps of:

providing a stationary platform having a measurement area and a setup area, said measurement area containing one or more locator stops disposed in predetermined locations in the measurement area;

providing a first movable platform and a second movable platform disposed on the stationary platform, said each movable platform comprising at least one positioning locator;

providing transport means for the first movable platform and for the second movable platform;

positioning a first workpiece on the first movable platform, said first movable platform being positioned in a first setup position in the setup area;

conveying said first movable platform from the first setup position to a first measurement position on the stationary platform;

activating the CMM to begin coordinate measurements;

while the CMM performs the measurements, positioning a second workpiece on the second movable platform said second movable platform being positioned in a second setup position in the setup area;

when CMM measurements are completed, conveying the first movable platform from the first measurement position back to the first setup position;

conveying the second movable platform from the second setup position to a second measurement position on the stationary platform;

activating the CMM to begin coordinate measurements; and when CMM measurements are completed, conveying the second movable platform from the second measurement position back to the second setup position.

5. The method of claim 4, wherein each movable platform comprises a plate having a top surface and a bottom surface, said plate containing holes disposed in predetermined locations on the top surface, said plate also containing at least one positioning locator.

6. The method of claim 5, wherein conveying a movable platform from a setup position to a measurement position comprises aligning the positioning locators on the movable platform against the locator stops disposed in the measurement area.

7. The method of claim 4, wherein positioning a first workpiece on a movable platform comprises:

affixing appropriate fixtures onto the movable platform; and securing the workpiece in a predetermined position on the fixtures disposed on the movable platform.

8. The method of claim 7, wherein securing the workpiece in a predetermined position on the fixtures disposed on the movable platform comprises bracing predetermined parts of the workpiece against predetermined wedges located on the fixtures.

9. The method of claim 7, further comprising clamping parts of the workpiece using at least one clamp contained in the fixtures.

10. The method of claim 7, wherein securing the workpiece in a predetermined position on the fixture disposed on the movable platform comprises aligning markers on the workpiece with markers on the fixture.

11. The method of claim 4, wherein conveying each movable platform into measuring position comprises providing an air jet between the movable platform and the stationary platform and manually guiding the positioning locators on the plate against the locator stops on the stationary platform.

12. The method of claim 4, further comprising repeating the steps of claim 3 for additional workpieces.

13. The method of claim 4, wherein a positioning tolerance for the workpiece relative to a predetermined position is about 0.02 inches.

* * * * *